(12) United States Patent
Andersson

(10) Patent No.: US 7,066,974 B1
(45) Date of Patent: Jun. 27, 2006

(54) DEVICE IN VENTILATION DUCTS PROVIDED WITH ADJUSTABLE FILTER MEANS

(76) Inventor: Per Otto Andersson, Askrikegatan 1, Stockholm (SE), 115 57

( * ) Notice: Subject to any disclaimer, the term of this patent is extended or adjusted under 35 U.S.C. 154(b) by 0 days.

(21) Appl. No.: 09/509,836

(22) PCT Filed: Oct. 23, 1998

(86) PCT No.: PCT/SE98/01923

§ 371 (c)(1),
(2), (4) Date: Jun. 7, 2000

(87) PCT Pub. No.: WO99/21638

PCT Pub. Date: May 6, 1999

(30) Foreign Application Priority Data

Oct. 28, 1997  (SE) .............................................. 9703936

(51) Int. Cl.
*B01D 46/44* (2006.01)

(52) U.S. Cl. ..................... 55/341.1; 55/302; 55/341.4; 55/341.7

(58) Field of Classification Search ................... 55/302, 55/324, 341.1, 341.4, 341.7, 484; 95/268, 95/280
See application file for complete search history.

(56) References Cited

U.S. PATENT DOCUMENTS

| 3,289,393 A | * | 12/1966 | Spotta | 55/341.7 |
| 3,605,387 A | * | 9/1971 | Margraf | 55/341.7 |
| 4,509,960 A | * | 4/1985 | Engel | 55/341.7 |
| 5,803,954 A | * | 9/1998 | Gunter et al. | 55/341.7 |

FOREIGN PATENT DOCUMENTS

WO    97/20615    6/1997

* cited by examiner

*Primary Examiner*—Duane Smith
*Assistant Examiner*—Minh-Chau T. Pham
(74) *Attorney, Agent, or Firm*—Jacobson Holman, PLLC

(57) ABSTRACT

The invention relates to an arrangement of ventilation plants including ducts in which bag filters or similar bag-shaped filters (4) made of filter gauze are mounted. For individual adjustment of the air throughflow capacity of the filters the effective length of the filters is adjusted which, according to the invention, is carried out by an actuating member (23) which is axially pressed against the end portion of the filter (4) directly or by use of a casing of net material enclosing the filter, which casing has two ends axially fixed and is pursed up by a ring-shaped member of the actuating member (23).

20 Claims, 1 Drawing Sheet

DEVICE IN VENTILATION DUCTS PROVIDED WITH ADJUSTABLE FILTER MEANS

BACKGROUND OF THE INVENTION

1. Field of the Invention

The present invention relates to an arrangement of ventilation ducts in which bag filters or similar bag-shaped filters made of filter gauze are mounted with the open end portions sealingly attached to the walls of the ducts. A balancing of the air flow in the ducts of the plant is achieved by required individual throttling of the air throughflow capacity of the filters by adjustment of the effective length of the filters.

2. Prior Art

Arrangements of this type are known from the Swedish patent 9504324-6. These arrangements comprise filters that are made such, that the air flows through the ducts can be adjusted in correspondence to the ventilation need. The technique results in lower energy for the treatment of the supplied air flow by reducing the flow to the actual need. By using the filters for adjusting the air flows a ventilation system has been created that also is characterized by clean ducts without complicating and noise generating filter boxes, mechanical throttling devices and similar means. The characteristic of working noiseless of tested plants has excited a well-founded attention. It is a condition, however, that the adjustment of the filters can be carried out in a simple and exact manner, and that the adjustment means have a long life.

SUMMARY OF THE INVENTION

The object of the invention is to achieve and arrangement of the kind set forth by way of introduction that fulfils the above mentioned demands.

This object is achieved in accordance with the invention by an arrangement having at least some of the filters provided with a linear feeding device which is positioned in parallel to the longitudinal direction of the filter and close to the outside of the filter. The feeding device is operating an attachment member which is movable back and forth and supports an actuating member which pushes axially against the closed end of the filter to press together a required portion of the filter.

Further improvements of the invention are that the actuating member has a shape of a substantially tapered cap having a diameter adapted to a diameter of the filter.

It is a further object of the invention that the central portion of the cap is provided with a small aperture.

Another object of the invention is that the filter is enclosed by a tubular air pervious casing that is longer than the filter and has end portions that are axially fixed. The actuating means includes a ring-shaped member with an opening with a substantially smaller diameter than the diameter of the filter, through which opening the casing extends and brings about the pressure of the ring-shaped member against the outside of the filter and the sliding along the outside of the filter, when the actuating member is applied against the end portion of the filter and is moved along the extension of the filter.

A still further object of the invention is that the casing comprises a large number of axially directed strings or flexible ribbons.

It is an object of the invention that wherein the casing has a shape of a hose made of net material.

Another object of the invention is that the feeding device comprises a screw device having a rotatably journalled threaded rod on which a threaded sleeve is movable supporting an attachment member of the actuating member.

It is an object of the invention that the feeding device comprises a rack along which the attachment member provided with a pinion is movable, to which the attachment member the actuating member is attached.

A further object of the invention is that the feeding device is provided with an electric motor for driving the attachment member.

Another object of the invention is that the feeding device is provided with a pneumatic motor for driving the attachment member.

It has turned out that such a simple device as an actuating means movable to and from that is applied against the end portion of the filter and is pressing together the filter a bit gives rise to a very exact adjustment of the air throughflow capacity of the filter. The actuating means may be tapered or hemispheric, and may preferably be provided with a central aperture securing the end portion of the filter safely in the actuating means.

The arrangement has, according to a preferred embodiment, the design as set forth in the ring-shaped actuating means presses by means of the casing the filter end portion axially and radially in a very careful way without letting the actuating means slide only against the outside of the filter but more through the casing, which can consist of a material that is more durable and exerts less friction forces in contact with the actuating means than with the filter.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE DRAWINGS

The invention will now be described in more detail with reference to two exemplifying embodiments thereof and with reference to the accompanying schematic drawings in which.

DESCRIPTION OF THE INVENTION

Figure 1:
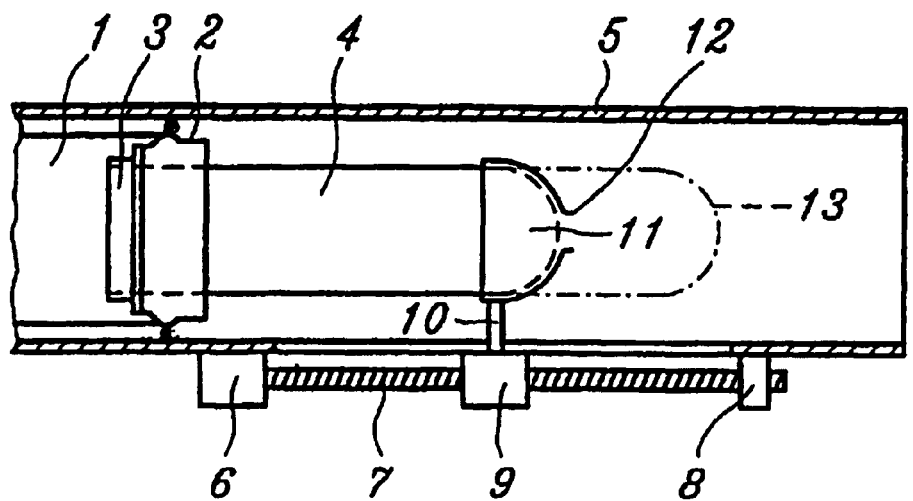
FIG. 1 is a side view, partly in section, of a first embodiment.

In describing preferred embodiment of the present invention illustrated in the drawings, specific terminology is employed for the sake of clarity. However, the invention is not intended to be limited to the specific terminology so selected, and it is to be understood that each specific element includes all technical and functional equivalents which operate in a similar manner to accomplish a similar purpose. It is also important to note that like parts are referenced by the same reference numeral throughout.

Figure 2:
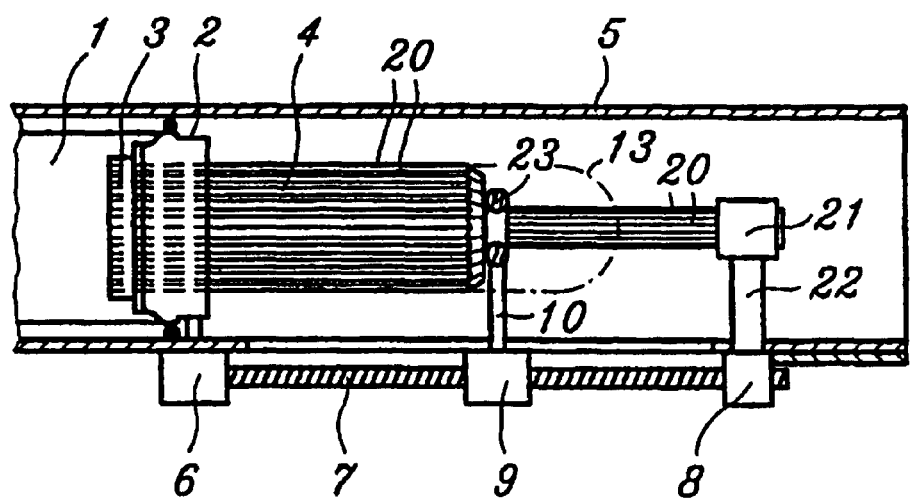
FIG. 2 is a side view, partly in section, of a second embodiment.

The invention will now be described in more detail with reference to two exemplifying embodiments thereof and with reference to the accompanying schematic drawings in which FIG. 1 is a side view, partly in section, of a first embodiment, and FIG. 2 is a side view, partly in section, of a second embodiment.

FIG. 1 shows an intake air duct 1 with an opening 2 in which a fastener 3 of a bag-like filter 4 is easily detachably attached. A hood 5 is attached around the filter 4. At the outside of the hood 4 a threaded rod 7 is rotatably journalled in the motor and in a bearing 8. A guide means with a threaded sleeve 9 is movably journalled on the rod 7 and provided with the same thread as the thread of the rod 7. The sleeve 9 is provided with an arm 10 extending through a sealed slit in the hood 5 and supporting a substantially conical actuating means 11 having a pointed end portion in which an aperture 12 is formed.

When completely folded out by the ventilation air flow the filter 4 has the shape indicated by the dot-dashed lines 13, and the actuating means 11 is positioned in an outer end position in contact with the end portion of the filter 4. Throttling of the air throughflow capacity is achieved by turning the rod 7 by the motor 6 such, that the sleeve 9 is moved to the left on the drawing bringing with itself the arm 10 and the actuating means 11. This means that the actuating means 11 is pressed against the end portion of the filter 4, which end portion is folded together to the shape shown on the drawing. By that the air throughflow capacity is reduced by a defined value. The opening 12 in the point of the actuating means 11 promotes to a safe fixation of the end portion of the filter against the inside of actuating means, which in addition to that may be perforated all over its surface.

As an alternative, the actuating means 11 may have the shape of a clamping device for securing the closed end of the filter to the actuating means, in which case the arm 10 suitably may be rotated for winding on or unwinding the filter during the movements of the arm 10.

An example of a preferred development of the embodiment shown in FIG. 1 is shown and described in the following with reference to FIG. 2, where the same reference numerals are used for similar details as in FIG. 1. In the embodiment according to FIG. 2 the filter 4 is provided with a casing 20 made of air pervious material, for example a plastic net, or a number of parallel strings or ribbons of plastic material, or other suitable material having a surface as slippery as possible. One end of the casing is attached to the fastener 3 of the filter and its other end is attached to a fixedly mounted clamping device 21 secured to an arm 22 extending through an opening in the wall of the hood 5. The tapered actuating means 11 in FIG. 1 is in the embodiment in fig. 2 replaced by a ring-shaped actuating means 23 enclosing a constricted part of the casing 20.

The embodiment shown in FIG. 2 is operated in the following manner. At the displacement of the actuating means 23 to the left on the drawing from the position indicated by the lines 13, the inner surface of the ring-shaped actuating means 23 slides with a low friction against the casing 20, which then squeezes together the end portion of the filter 4, such that the length of the filter is shortened in correspondence to the displacement of the actuating means 23. This arrangement means a careful treatment of the filter 4, which usually has a rough surface and sometimes is easily damaged. The casing 20 prevents more or less a direct contact between the filter and the actuating means.

The invention is of course not limited to the described and illustrated embodiments thereof but can be modified in different ways within the inventive concept as defined by the following claims. For instance, the operating of the actuating means 11 and 23 can be performed in different ways, for instance by chain or belt driving instead of the threaded rod 7. Further, the electric motor may be replaced by a pneumatic or hydraulic motor and the rod 7 by a gear rack. Self-explanatory, the filter may also be positioned in an exhaust air opening or in another place in an air treatment plant.

What is claimed is:

1. An arrangement of ventilation plants comprising ducts in which bag-shaped filters made of filter gauze are mounted with open end portions sealingly attached to walls of the ducts, and balancing of the air flows in the ducts of the plants is achieved by required individual throttling of the air throughflow capacity of the filters by adjustment of a length of the filters, at least one of said filters provided with a linear feeding device positioned parallel to a longitudinal direction of said filter and including an attachment member movable back and forth along the longitudinal direction of said filter, said attachment member supporting an actuating member for pushing axially against a closed end of the filter to press a portion of the filter towards said open end.

2. The arrangement according to claim 1, wherein the actuating member has a substantially tapered cap shape having a diameter for adapting to said closed end of said filter.

3. The arrangement according to claim 2, wherein a central portion of the cap is a small aperture.

4. An arrangement of ventilation plants comprising ducts in which longitudinal filters are mounted with open end portions sealingly attached to walls of the ducts, and balancing of the air flows in the ducts of the plants is achieved by required individual throttling of the air throughflow capacity of the filters by adjustment of a length of the filters, at least one of said filters enclosed by a tubular air pervious casing that is longer than the filter and has end portions that are axially fixed, and a linear feeding device including an attachment member movable back and forth along a longitudinal direction of said filter and a casing, said actuating member including a ring-shaped member with an opening with a substantially smaller diameter than a diameter of the filter, through which opening the casing extends and brings about a pressure of the ring-shaped member against the outside of the filter and, when the actuating member is applied against the end portion of the filter, is moved along an extension of the filter.

5. The arrangement according to claim 4, wherein the casing comprises a large number of axially directed strings.

6. The arrangement according to claim 4, wherein the casing has a shape of a hose made of net material.

7. The arrangement according to claim 1, wherein the feeding device comprises a screw device having a rotatably journalled threaded rod on which a threaded sleeve is movable supporting said attachment member of the actuating member.

8. The arrangement according to claim 1, wherein the feeding device comprises a rack along which said attachment member provided with a pinion is movable, to which said attachment member the actuating member is attached.

9. The arrangement according to claim 1, wherein the feeding device is provided with an electric motor for driving the attachment member.

10. The arrangement according to claim 1, wherein the feeding device is provided with a pneumatic motor for driving the attachment member.

11. The arrangement according to claim 4, wherein the casing comprises a large number of axially directed flexible ribbons.

12. The arrangement according to claim 4, wherein the feeding device comprises a screw device having a rotatably journalled threaded rod on which a threaded sleeve is movable supporting an attachment member of the actuating member.

13. The arrangement according to claim 4, wherein the feeding device comprises a rack along which said attachment member provided with a pinion is movable, to which said attachment member the actuating member is attached.

14. The arrangement according to claim 4, wherein the feeding device is provided with an electric motor for driving the attachment member.

15. The arrangement according to claim 4, wherein the feeding device is provided with a pneumatic motor for driving the attachment member.

16. In an arrangement of ventilation plants including ducts in which bag-shaped filters are mounted with open end portions sealingly attached to walls of the ducts, and balancing of the air flows in the ducts of the plants is achieved by individual throttling of the air throughflow capacity of the filters by adjustment of a length of the filters, the improvement comprising a linear feeding device associated with at least one of said filters, said device having an actuating member operatively associated with the closed end of the filter to adjust the operative filter length of said at least one filter.

17. In the arrangement according to claim 16, wherein said linear feeding device includes an attachment member movable back and forth along a longitudinal direction of said filter, said attachment member supporting said actuating member for pushing axially against said closed end of the filter to press the filter towards said open end.

18. In the arrangement according to claim 17, wherein said actuating member has a substantially tapered cap shape for adapting to said closed end of said filter and includes a small aperture in a central portion.

19. In the arrangement according to claim 17, wherein said actuating member includes a casing having a ring-shaped member with an opening with a substantially smaller diameter than a diameter of the filter, through which opening the casing extends and brings about a pressure of the ring-shaped member against the outside of the filter and, when the actuating member is applied against the end portion of the filter, is moved along an extension of the filter.

20. In the arrangement according to claim 16, wherein said feeding device comprises a screw device having a rotatably journalled threaded rod on which a threaded sleeve is movable supporting said attachment member of the actuating member.

* * * * *